United States Patent Office 3,321,557
Patented May 23, 1967

3,321,557
PROCESS FOR EXCHANGING HALOGEN ATOMS FOR HYDROCARBON RADICALS IN PHOSPHORUS HALIDE COMPOUNDS
Ludwig Maier, Zurich, Switzerland, assignor to Monsanto Company, St. Louis, Mo., a corporation of Delaware
No Drawing. Filed May 31, 1966, Ser. No. 553,668
Claims priority, application Switzerland, Oct. 23, 1961, 12,295/61; Mar. 28, 1962, 3,813/62
11 Claims. (Cl. 260—968)

This application is a continuation-in-part of copending application Ser. No. 231,002, filed Oct. 16, 1962.

In the U.S. Patents 2,615,043, 2,636,893 and 2,636,894 containing an identical description, however, different claims, it is quite generally stated that by action of tetrahydrocarbyl lead on certain mineral halides there can be prepared optional compounds of the formula $R_n$—M—$X_m$, wherein R signifies an organic radical such as alkyl, aryl, aralkyl or alkaryl; M is a metal, non-metal or semi-metal such as arsenic, phosphorus or antimony; X stands for halogen, generally chlorine or bromine; the subscripts $n$ and $m$ being whole numbers which add up to the valence of the constituent M. However, only the preparation of a single phosphorus compound, namely ethylphosphonous dichloride from phosphorus trichloride and tetraethyl lead, is exemplified in these patent specifications. The reactants were heated at an oil bath temperature of 110° for 36 hours. The yield was 89%, but the product seems to be strongly contaminated as may be concluded from the higher chlorine content (56.2% instead of 54.2%). In another reference (M. H. Beeby and F. G. Mann, J. Chem. Soc. 411, 1951) is reported that by heating ethylphosphonous dichloride with tetraethyl lead in a molecular ratio of 4.6:1 at 140–145° C. for 36 hours, there is formed diethylphosphinous chloride in 70% yield. Finally, in the literature it is also reported that no reaction occurs between tetraphenyl lead and phosphorus trichloride at 134° C. (F. Challenger and F. Pritschard, J. Chem. Soc. 125, 864, 1924).

Owing to this prior art it was doubtful whether phenyl radicals could be introduced into phosphorus halide compounds by means of tetraphenyl lead. Also it was questionable whether a third hydrocarbon radical could be introduced at all, i.e. whether the last halogen atom on the phosphorus atom could also be exchanged, since tertiary phosphines had never been prepared up to now by this method.

My experiments made evident that heating of phosphorus trichloride with tetraphenyl lead (Ph$_4$Pb) in a molar ratio of 3:1 under pressure at 180° C. for 40 hours did not effect arylation, but on prolonged heating for a total of 180 hours 93% PhPCl$_2$ and 2% Ph$_2$PCl were isolated. In the reaction of e.g. MePCl$_2$ with Ph$_4$Pb in a molar ratio of 2:1 at 100° C. no reaction was apparent after 18 hours but after heating at 165° C. for 39 hours 55% PhPCl$_2$ and 20% Me(Ph)PCl was obtained. As may be seen, a strong decomposition has occurred in the last case. Such decompositions or disproportionations and, consequently, mixtures of various endproducts always appear when the reaction temperature is relatively high, i.e., above about 120° C., and when different organic substituents attached to the phosphorus are involved.

Nevertheless, it has been found possible to prepare tertiary phosphines by this method. In the reaction of e.g. Ph$_2$PCl with Ph$_4$Pb in a molar ratio of 3:1 in a closed vessel at 180° C., there was obtained 95% Ph$_3$P. Of course, in the preparation of asymmetric tertiary phosphines at such high temperatures, again various endproducts will simultaneously be formed because of disproportionation. It is evident, that these processes will not have importance from the technical view point, because of the high reaction temperatures necessary and the extremely long reaction time.

Now it has been found that the exchange of halogen atoms for hydrocarbon radicals in phosphorus halide compounds by means of tetraalkyl, tetracycloalkyl, tetraaralkyl, or tetraaryl lead, further denoted shortly tetrahydrocarbyl lead, can be considerably promoted by catalysis. Thus, the process can be carried out on a technical scale. Suitable catalysts are strong Lewis acids such as CuCl$_2$, BeCl$_2$, MgCl$_2$, ZnCl$_2$, CdCl$_2$, HgCl$_2$, BF$_3$, BCl$_3$, AlCl$_3$, AlBr$_3$, AlJ$_3$, GaCl$_3$, InCl$_3$, TlCl$_3$, CeCl$_3$, SnCl$_4$, TiCl$_4$, ZrCl$_4$ SbCl$_4$, BiCl$_5$, BiCl$_3$, TeCl$_2$, TeCl$_4$, MoCl$_4$, WCl$_4$, UCl$_4$, FeCl$_2$, FeCl$_3$, CoCl$_2$, CoCl$_3$, NiCl$_2$ etc. The selection of the most appropriate catalysts conforms on one side to the reactants and conditions of reaction, and on the other side the solubility relations and the possibilities of recovery play an important role. As a rule, the catalysts form adducts or complexes with the phosphorus compounds. It is possible therefore to use also easily volatile catalysts like BF$_3$ (B.P. —101° C.) and BCl$_3$ (B.P. 12.5° C.). The endproduct should not bind the metal halide stronger than the starting materials. The complex formed should not separate because of difficult solubility. As catalysts can also be used the adducts such as RPCl$_2$·AlCl$_3$, R$_2$PCl·AlCl$_3$ and $$R_3P \cdot AlCl_3$$

which are formed with the desired endproducts. By this, the yield calculated on the phosphorus compound used in the reaction will be increased for the part which otherwise would be bound to the catalyst and non-distillable (see Example 1). The adducts are generally soluble in the reaction products or in solvents, so that they can easily be separated from the insoluble lead dichloride. However, complex compounds as obtainable by bringing together, for example PCl$_3$, a metal halide and a chlorohydrocarbon, can also be employed. The liquid complex compound of the formula [CH$_3$PCl$_3$+][Al$_2$Cl$_7$-] may be cited as an example. It is clear that organic derivatives such as ethylaluminum dichloride, diethylaluminum chloride, phenylaluminum dichloride etc. of the mineral halides enumerated above are capable of displaying a similar catalytic activity. They probably appear even as intermediates in the reaction and must be considered as being comprises in the scope of the instant invention. However, they do not show particular advantages over the purely inorganic salts as originally put in the reaction mixture. The proposed catalysts are employed in a concentration of 0.1–10 moles percent, based on the phosphorus halide compound.

Aluminum chloride has previously been used in the prepartion of alkyldichlorophosphines. At first, a complex compound of the formula [RPCl$_3$+][AlCl$_4$-] (Komkow et al., J. allg. Chem. 28 (90) 2963 (1958)) or [RPCl$_3$+][Al$_2$Cl$_7$-] (D. Patentanm. 1,119,860–1 (1961)) was prepared from PCl$_3$, AlCl$_3$ and a chlorohydrocarbon. Then, the compound was reduced with aluminum to the desired endproduct. It was also known that halogen attached to trivalent phosphorus can be exchanged for alkyl by means of aluminumtrialkyls or alkylaluminum chlorides (Weyer, K., Doktorarbiet, T. H. Aachen (1956), Okhlubystin et al. C.A. 53, 1122g (1959)). Regarding this prior method in which the aluminum chloride was used in stoichiometric quantities, the process of invention did not become obvious.

In the present process the phosphorus halides or organic phosphorus halides are reacted with a tetrahydrocarbyl lead in the presence of a strong Lewis acid, preferably aluminum halide. When all of the hydrocarbon radicals of the lead compound are utilized, that represents the ideal case, then the reaction proceeds with e.g. phosphorus trichloride and tetraethyl lead according to the following equation:

$$PCl_3 + PbEt_4 \rightarrow PEt_3 + PbCl_2 + EtCl$$

In all cases where at maximum ⅓ mole of the tetrahydrocarbyl lead is employed for each halogen atom to be replaced, the course of reaction also is ideal for the reason that lead dichloride is the byproduct which can easily be separated from the distillable endproducts, owing to its difficult solubility and non-volatility. The reaction probably proceeds in two stages with respect to the lead compound; at first it exchanges very easily two of its four hydrocarbon radicals for halogen attached to phosphorus $$PCl_3 + PbEt_4 \rightarrow Et_2PCl + Et_2PbCl_2$$

This first step occurs by addition of a catalyst at room temperature or at temperatures below about 60° C. extremely fast and is exothermic in the presence of a catalyst. In the second step, the diethyl lead dichloride probably disproportionates giving again the more reactive triethyl lead chloride and ethyl lead trichloride:

$$2Et_2PbCl_2 \rightarrow Et_3PbCl + EtPbCl_3$$

The latter decomposes giving lead chloride which precipitates in the reaction mixture, and besides, ethyl chloride is formed $$EtPbCl_3 \rightarrow PbCl_2 + EtCl$$

Triethyl lead chloride, as well as, of course, also tetraethyl lead, is obviously able to cause exchange of the last halogen on the phosphorus for ethyl, since the diethyl lead dichloride re-formed, again disproportionates with precipitation of difficultly soluble lead dichloride, thereby a shift of the reaction equilibrium takes place. This disproportionation is accelerated by the catalysts. In carrying out the second stage of reaction, a higher reaction temperature, e.g. above 80° C. for the chlorides, is necessary. However, by using a catalyst this reaction temperature can be held considerably lower and be limited at about 120° even in the manufacture of tertiary phosphines.

When in the phosphorus halide compounds serving as starting materials several halogen atoms attached to phosphorus are present, it is possible that they can only partly be exchanged. In the ideal case the over-all reaction can be illustrated as follows:

$$3PCl_3 + 3-nPbR'_4 \rightarrow 3R'_{3-n}PCl_n + 3-nPbCl_2 + 3-nR'Cl$$

($n = 0$, 1 or 2)

If it is a matter of substituting only one halogen atom it can often be expedient to use a greater excess of the phosphorus halide compound, which can be recovered by distillation.

Tetraalkyl, tetracycloalkyl, tetraaralkyl and tetraaryl derivatives are preferably used as the organo lead compounds. The hydrocarbon radicals can be unsaturated like vinyl, ethynyl, allyl, cyclopentenyl, cyclohexenyl, cyclohexadienyl, cinnamyl, styryl etc. They further can show optional substituents like halogen, ester, ether, cyano, nitro groups etc., so long as these substituents do not hinder the reaction and as such lead compounds can conveniently be prepared at all. The expert will recognize from that what has been disclosed herein that trihydrocarbyl lead halides and dihydrocarbyl lead dihalides are suitable and comprised within the scope of this invention.

The simplest class of organic trivalent phosphorus halide compounds which can be used possess the general formula $$R_mPX_{3-m}$$

($m = 1$ or 2)

The lowest representatives of this range of homologues are MePX$_2$ and Me$_2$PX. Any other hydrocarbon radical can take the place of methyl (Me), which can be, as in the lead compounds, unsaturated or bear optional atoms or atom groups, so far as the reaction will not be hindered thereby.

However, it is obvious to use also such trivalent starting phosphorus halide compounds which show two or several phosphorus halide groups. The phosphorus atoms can directly be linked together as in the diphosphines, triphosphines etc. Simple examples belonging to a range of homologues are compounds of the formula X$_2$P—PX$_2$, X(Me)P—P(Me)X, $$X(Me)P-P(Me)-P(Me)X$$

etc. Or, the phosphorus atoms can be linked through a hydrocarbon group or heteroatom like O, S, N etc. Simple examples are X$_2$P—CH$_2$—PX$_2$, $$X(Me)P-CH_2-CH_2-CH_2-P(Me)X$$

etc.

A further class of suitable trivalent phosphorus halide compounds contain, instead or besides a hydrocarbon radical, one or two radicals of ammonia, a primary or secondary amine, a hydroxyl compound or a mercaptan. Because of the relatively low reaction temperatures in the catalytically promoted reaction, such amine, alcohol, phenol and mercaptan radicals will not be altered. It is clear that such phosphorus halide compounds are suitable too, which contain the radicals of di- or poly-functional amines like 1,2-diaminoethane, 1,3-bis(methylamino)-propane, hydrazine, guanidine, urea, 2-methylaminoethanol, bis(ethylamino) benzenes, piperidine, melamine, aminophenols etc.; alcohols like glycol, glycerine etc.; phenols like dihydroxybenzenes, phloroglucine, hydroxynaphthols etc.; or mercaptans like thioglycol, dithiobenzenes etc.

Under the term phosphorus halide compound is understood herein quite generally any compounds which possess at least one halogen atom attached to phosphorus. In general, the halogen is a chlorine or bromine atom. The phosphorus compounds and the tetraorgano lead compounds do not all show the same reactivity. By heating various phosphorus halide compounds with tetraethyl lead at the same temperature for different time intervals and subsequently analyzing the reaction mixture by P$^{31}$ nuclear magnetic resonance, the following approximate series of reactivity were found:

$$PBr_3 \approx CH_3PBr_2 > PCl_3 > CH_3PCl_2 \approx C_6H_5PCl_2$$
$$> (CH_3)_2PCl \approx (C_6H_5)_2PCl > PSCl_3 \approx C_6H_5PSCl_2$$
$$\approx CH_3PSCl_2 > ClCH_2PSCl_2 > (CH_3)_2PSCl$$
$$> POCl_3 \approx C_6H_5POCl > ClCH_2POCl_2$$

By the same method some tetraorgano lead compounds showed the following reactivity:

$$Pb(CH_3)_4 \approx Pb(C_2H_5)_4 > Pb(C_4H_9)_4 > Pb(C_6H_5)_4$$

The instant process has practical importance so far as the necessary lead compounds can economically be prepared, and, if it is a matter of obtaining endproducts having distinct organic ligands, or exchanging only one halogen atom in trivalent phosphorus compounds having two or three halogen atoms, or, if the starting materials contain such substituents which are altered in the common methods of alkylation.

The conventional methods for introducing hydrocarbon radicals, such as the Fridel-Crafts reaction which, after all, is only applicable to the preparation of aromatic derivatives, Grignard reaction or the reaction with organolithium compounds lead, generally, either only to tertiary phosphines or to mixtures containing endproducts which are organically substituted to a various degree. The separation is troublesome and expensive because of the presence of relatively large quantities of complexing aluminum or magnesium halides. Moreover, the reaction does not proceed in the desired manner with many of the starting compounds mentioned herein, especially with those containing radicals of alcohols, phenols, mercaptans or amines as substituents, or unsaturated radicals, or radicals having functional groups.

In carrying out the reaction, the starting phosphorus compounds are brought to reaction with the tetrahydrocarbyl lead in suitable proportions in the presence of the catalyst under exclusion of moisture, and if necessary in a nitrogen atmosphere. The reaction temperature is in the range of 20–120° C., however, higher temperatures and pressure may also be applied. The reaction time depends on the reaction temperature, the reactivity of the reaction partners and also the number and kind of the halogen atoms to be replaced. It is about ½ to 24 hours. The process can be carried out in presence or absence of inert solvents, diluents or dispersing agents. Often it may be advantageous to use the starting phosphorus halide compound or the phosphorus compound to be prepared as a solvent. In working up the reaction mixture may also be subjected directly to fractional distillation in vacuum. The complex which is formed from the catalyst and the endproduct can be separated by means of a solvent and may be recycled. The phosphorus compound can also be liberated from the complex or adduct respectively, by adding an alkali chloride, or, if the stability permits, by hydrolysis. In the process of the invention normally the reactants and the products will have hydrocarbon groups which each have not more than 18 carbon atoms and usually not more than 8 carbon atoms; however, the process of the invention can be carried out with reactants which have more than 18 carbon atoms in hydrocarbon groups.

*Example 1*

In a two-necked flask provided with a reflux condenser and a stirrer, containing 44 g. (0.2 mole) of diphenylchlorophosphine and 3.2 g. (0.024 mole) of aluminum chloride, are slowly added in a nitrogen atmosphere dropwise 32.3 g. (0.1 mole) of tetraethyl lead. An exothermic reaction starts at once and lead dichloride precipitates. Subsequently, the mixture is heated at 110° for 4 hours and then the precipitated salts (37 g., chiefly lead dichloride) are filtered off. On fractional distillation of the filtrate are obtained 22.6 g. (53% of ethyl-diphenylphosphine; B.P. 112–116° C./0.1 mm.; 126–130° C./0.5 mm. (lit. B.P. 184° C./22 mm., J. Meisenheimer, Lieb. Ann. 449, 213 (1906)). For the identification is added to 1 g. of the ethyl-diphenylphosphine obtained above, a calculated amount of ethyliodide and the mixture left standing at room temperature for some time. The phosphonium salt of the formula [$(C_6H_5)_2P(C_2H_5)_2$]I, is formed in quantitative yield. After recrystallization twice in alcohol-ether it melts at 199.5–201° C. (lit. M.P. 204–205° C., W. A. Henderson and S. A. Buckler, J. Am. Chem. Soc. 82, 5794 (1960)). A certain quantity of the ethyldiphenylphosphine remains in form of an adduct

[$AlCl_3 \cdot (C_6H_5)_2PC_2H_5$]

which cannot be separated by distillation. When for this reason to the reaction mixture is added finely comminuted sodium or potassium chloride prior to the filtration, thereby the phosphine is liberated from the complex by formation of alkali tetrachloroaluminate, or when as a catalyst a corresponding quantity of the above formulated adduct or only 0.01 mole of aluminum chloride are used, the yields are increased to 27.7 g. (64.7%) or to 25.6 g. (59.8%) respectively, in the latter case.

The reaction of diphenylchlorophosphine with tetraethyl lead is repeated as described above. However, no catalyst is used and the heating time is 27 hours. The lead salts filtered off amount of 28.5 g. and on fractionation of the filtrate are obtained 23.8 g. (55.6%) ethyl-diphenylphosphine.

In an analogous experiment, the reaction mixture is heated without a catalyst at 125° C. for 66 hours. On fractionating the filtrate there are obtained besides ethyldiphenylphosphine, also diethylphenylphosphine and triphenylphosphine. Thus, a disproportionation occurred.

*Example 2*

In a two-necked flask provided with a reflux condenser and a stirrer, containing 17.9 g. (0.1 mole) of phenyldichlorophosphine and 1.6 g. (0.012 mole) of aluminum chloride, are slowly added in a nitrogen atmosphere dropwise 32.3 g. (0.1 mole) of tetraethyl lead. An exothermic reaction starts at once and lead dichloride precipitates. Subsequently, the mixture is heated at 120° C. for 3 hours and then benzene is added and the precipitated salts (chiefly lead dichloride) are filtered off. On fractional distillation of the filtrate are obtained 11.5 g. (69%) of diethylphenylphosphine; B.P. 60–65° C./2 mm. (lit. 96–98° C./10 mm.; W. C. Davies and W. P. G. Lewis, J. Chem. Soc. 1599 (1934)). For the identification the phosphine is converted, as described in Example 1, into the phosphonium salt of the formula [$C_6H_5P(C_2H_5)_3$]I; M.P. 137–139° C. (Lit. 139° C.; Davies and Lewis, loc. cit.; 140–141° C.: Henderson, Jr., and Buckler, loc. cit.)

*Analysis.*—Iodine calc. for $C_{12}H_{20}IP$: 39.4%, found 39.6%

In an analogous experiment, the same reaction is carried out by using $BCl_3$ (0.012 mole). The yield of diethylphenylphosphine is of about the same order.

In a further analogous experiment, the same reaction is carried out, but without a catalyst. It is chiefly formed ethyl-phenylchlorophosphine, B.P. 73–75° C./2 mm., besides a relatively small amount of diethylphenylphosphine.

*Example 3*

In a two-necked flask provided with a reflux condenser and a stirrer, containing 26.9 g. (0.17 mole) phenylmethylchlorophosphine and 0.7 g. (0.005 mole) of aluminum chloride, are slowly added in a nitrogen atmosphere dropwise 22.6 g. (0.07 mole) of tetraethyl lead. An exothermic reaction starts at once and lead dichloride precipitates. Subsequently, the mixture is heated at 110° C. for 4 hours and the precipitated salts are filtered off. On fractional distillation of the filtrate are obtained 15 g. (62%) of methyl-ethyl-phenylphosphine; 96–97° C./15 mm. (lit. 96–97° C./15 mm., L. Horner and A. Mentrup, Lieb. Ann. 646, 65 (1961)). For the identification the phosphine is converted, as described in Example 1, into the phosphonium salt of the formula [$C_6H_5(CH_3)P(C_2H_5)_2$]I; M.P. 104–105° C. (lit. 108–109° C.: J. Meisenheimer et al., Lieb. Ann. 449, 213 (1926)).

*Analysis.*—I calc. for $C_{11}H_{18}IP$: 41.2%, found 41.4%

In an analogous experiment the same reaction is carried out without a catalyst. There are obtained 7.3 g. (30%) methyl-ethylphosphine.

*Example 4*

In a two-necked flask provided with a reflux condenser and a stirrer, containing 53.7 g. (0.3 mole) of phenyldichlorophosphine and 1.3 g. (0.01 mole) of aluminum chloride, are slowly added in a nitrogen atmosphere dropwise 26.7 g. (0.1 mole) of tetramethyl lead. An exothermic reaction starts at once and lead dichloride precipitates. Subsequently, the mixture is heated at 100° for 2 hours and the precipitated salts (26 g., chiefly lead dichloride) are filtered off. On fractional distillation of the filtrate are obtained 29 g. (61%) of methyl-phenylchlorophosphine; B.P. 66–67°/2 mm. In analogous experiments are used each time 0.01 mole of $CuCl_2$, $TiCl_4$, $HgCl_2$ or $BCl_3$. The yields of methyl-phenylchlorophosphine is in about the same order. In an analogous experiment without using a catalyst are obtained 15.7 g. (33%) methylphenylchlorophosphine.

Example 5

In a two-necked flask provided with a reflux condenser and a stirrer, containing 53.7 g. (0.3 mole) of phenyldichlorophosphine and 1.3 g. (0.01 mole) of aluminum chloride, are slowly added in a nitrogen atmosphere dropwise 32.3 g. (0.1 mole) of tetraethyl lead. An exothermic reaction starts at once and lead dichloride precipitates. Subsequently, the mixture is heated at 120° for 4 hours and the precipitated salts (27.8 g., chiefly lead dichloride) are filtered off. On fractional distillation of the filtrate are obtained 42.3 g. (80%) of ethyl-phenylchlorophosphine; B.P. 73–75° C./2 mm. (lit. B.P. 76° C./2 mm., Hudson and Green, Proc. Chem. Soc. 145, 1961). In an analogous experiment the same reaction is carried out in 100 ml. of anhydrous toluene. There are obtained 46.5 g. (88%) ethyl-phenylchlorophosphine.

Example 6

In a two-necked flask provided with a reflux condenser and a stirrer, containing 46.3 g. (0.3 mole) of bis(dimethylamino) and chlorophosphine and 1.3 g. (0.01 mole) of aluminum chloride, are slowly added in a nitrogen atmosphere dropwise 26.7 g. (0.1 mole) of tetramethyl lead. An exothermic reaction starts at once and lead dichloride precipitates. Subsequently, the mixture is refluxed for 1 hour and the precipitated $PbCl_2$ is filtered off and washed with ether. On fractional distillation of the filtrate are obtained 37.4 g. (93%) of methyl-bis(dimethylamino)phosphine; B.P. 140° C. In an analogous experiment without using a catalyst refluxing for 10 hours is necessary for obtaining about the same yield of methyl-bis(dimethylamino) phosphine.

It has further been found that optional hydrocarbon radicals can be introduced into compounds containing phosphorus oxyhalide or phosphorus thiohalide groups by reaction with organolead or organotin compounds.

Phosphorus compounds which are suitable for the instant process are in the simplest case the phosphorus oxyhalides and the phosphorus thiohalides themselves.

The organolead and organotin compounds used herein are preferably tetraalkyl, tetracycloalkyl, tetraaralkyl and tetraaryl derivatives. The hydrocarbon radicals may be unsaturated, such as vinyl, allyl, cyclopentenyl, cyclohexenyl, cyclohexadienyl, cinnamyl, styryl etc. However, they may also show optional substituents, such as halogen, ester, ether, cyano, nitro groups etc., so long as these do not hinder the reaction.

In the reaction of the mentioned phosphorus compounds with such organolead or organotin compounds, the halogen atoms present are exchanged for hydrocarbon radicals. The reaction proceeds, for example, using phosphoryl chloride and tetramethyllead according to the following scheme:

$$3POCl_3 + 3-n(Me)_4Pb \rightarrow 3(Me)_{3-n}POCl_n + 3-nPbCl_2 + 3-nMeCl$$

($Me = CH_3$, $n = 0.1$ or 2)

According to the molar ratio of the reactants there are obtained phosphonyl halides, phosphinyl halides or tertiary phosphine oxides, or the analogues, respectively, which contain sulfur instead of oxygen. The corresponding organotin compounds react, on principle, in the same manner.

Thus, in the phosphorus oxyhalides and phosphorus thiohalides there can be exchanged successively one, two or all three of the halogen atoms for hydrocarbon radicals. The result is that such starting compounds can also be used, already containing hydrocarbon radicals attached to the phosphorus, so long as a replaceable halogen atom still is available. Examples of such compounds belonging to the simplest kind are $MePOCl_2$, $(Me)_2POCl$, $MePSCl_2$, $(Me)_2PSCl$ etc. Also it becomes apparent that by the process herein described such phosphorus compounds can be prepared, which possess, possibly besides a halogen atom, hydrocarbon radicals being different from one another.

The hydrocarbon radicals present in the starting phosphorus compounds can be unsaturated or bear optional atoms or atom groups, as in the organolead and organotin compounds, so far as the reaction will not be hindered hereby. It is clear that the starting compounds can also be prepared by conventional methods, e.g. by oxidation or sulfuration of substituted phosphine halides, by addition of $PCl_5$ to 1,2-olefins, indene etc. and conversion of the reaction products by means of carboxylic acids, $P_2O_5$ or $SO_2$ into the corresponding phosphorus oxyhalides of the type $R_2CClCH_2POCl_2$ or $R_2C=CHPOCl_2$, by reaction of triphenylcarbinol with $PCl_3$ etc. Then, by reaction with an organolead or organotin derivative, there are obtained phosphorus compounds containing mixed organic substituents.

It is obvious, that such starting compounds can also be used which are composed of two phosphorus oxyhalide or phosphorus thiohalide groups linked together through a hydrocarbon radical, an oxygen atom or a sulfur atom. These compounds correspond, in the simplest case, to the formulae $$Cl_2P(O)-CH_2-(O)PCl_2$$
$$Cl(Me)P(O)-CH_2-(O)P(Me)Cl$$
$$Cl_2P(O)-O-(O)PCl_2$$
$$Cl(Me)P(O)-O-(O)P(Me)Cl$$

or to the possible sulfur analogues, respectively. In the place of methyl (Me) there can again be other hydrocarbon radicals or radicals as will be described below.

It has further been found that radicals of hydroxyl compounds, mercaptans and secondary amines attached to the phosphorus, are not affected in the novel reaction. Thereby, another class of useful starting compounds are disclosed for the instant process. Examples of such compounds belonging to the simplest kind are $MeOPOCl_2$, $(MeO)_2POCl$, $Me_2NPOCl_2$, $(Me_2N)_2POCl$ etc. or the possible sulfur analogues thereof, respectively. As an example of a compound belonging to a more complicated kind, the reaction product of a diacetone alcohol and phosphorus trichloride, which possesses the structure

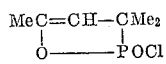

may be cited.

The expert will recognize that all organic radicals mentioned till now may be combined in the starting compounds in optional manner. He also will recognize that instead of two radicals there may also be present on the phosphorus a radical of a difunctional hydroxyl compound, difunctional mercaptan, or difunctional secondary amine, i.e. radicals of diols, like 1,2-dihydroxyethane, 1,3-dihydroxypropane, orthodihydroxybenzene etc., or dithiols, like 1,2-dithioethane, 1,3-dithiopropane, ortho-dithiobenzene etc., or secondary diamines, like 1,2-di(methylamino) ethane, 1,3-di(methylamino) propane, ortho-di(methylamino) benzene etc., or aminoalcohols, like 2-methylaminoethanol, or aminophenols, like ortho-methylaminophenol etc.

However, such compounds here also are included which contain two phosphorus oxyhalide or phosphorus thiohalide groups linked together through one or two of such difunctional radicals, such as

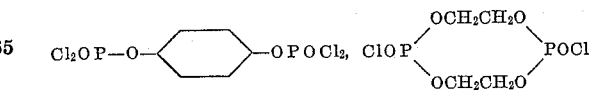

etc.

The conventional methods for the introduction of hydrocarbon radicals, such as the Friedel-Crafts reaction which, after all, is only fit for the preparation of aromatic derivatives, or the reaction with lithium hydrocarbons leads, generally, to mixtures containing a number of end-products which are substituted to a various grade. The separation is troublesome and time-consuming because of the presence of complexing aluminum or magnesium halides. Moreover, the reaction does not proceed in the desired manner with many of the starting compounds mentioned herein, especially with those containing radicals of alcohols, phenols, mercaptans or secondary amines as substituents, or unsaturated radicals, or radicals having functional groups. As opposed to that, with the process of invention all starting compounds possessing a phosphorus oxyhalide or phosphorus thiohalide group as considered herein can be reacted in the required manner and any desired grade of substitution can be achieved. The resulting endproducts can easily be separated from the accompanying lead or tin salts.

Although in this specification the starting compounds are generally designed by the term halides and, at times, are represented in their formulae as chlorides, this does not mean that fluorides, bromides and iodides would not be suitable as well.

It is comprehended that in the instant process such organolead and organotin compounds are particularly preferred which can simply be prepared on a technical scale, as for example, tetramethyllead, tetraethyllead etc. from alkali metallead alloy, and tetrabenzyltin, tetraallyltin etc. from elemental tin and the necessary hydrocarbon halides. In general, tetraorgano derivatives are used. But depending on the circumstances, halides, such as $Me_3SnCl$, $Me_2SnCl$, $Me_2SnCl_2$, or mixtures of e.g. $(Me)_4Sn$ and $SnCl_4$, respectively, which have been coproportionated in usual manner, can also be advantageous in the practice of the invention.

In carrying out the new reaction, the starting phosphorus compounds and an organolead or organotin derivative in suitable proportions are heated at higher temperatures if need be under pressure, for a longer period. In general, the required temperatures lie in the range of about 100–200° C., however, one can also work even at higher temperatures at convenience. The reaction can be carried out with or without a solvent. Moisture has to be excluded from the reaction mixture. The reaction time is about 1 hour to several days according to the reactivity of the reactants, to the number of hydrocarbon radicals to be introduced and to the working technic employed. It has further been found that the reaction can substantially be promoted by addition of the strong Lewis acid catalysts of the invention named hereinabove.

By heating various phosphorus compounds with organolead compounds at the same temperature for different time intervals and subsequently analyzing the reaction mixture by $P^{31}$ nuclear magnetic resonance, the following approximate series of reactivity were found:

$PSCl_3 \approx C_6H_5PSCl_2 \approx CH_3PSCl_2 > ClCH_2PSCl_2 >$
$(CH_3)_2PSCl > POCl_3 \approx C_6H_5POCl_2 > ClCH_2POCl_2$ By the same method some tetraalkyllead compounds showed:

$Pb(CH_3)_4 \approx Pb(C_2H_5)_4 > Pb(C_4H_9)_4 > Pb(C_6H_5)_4$

The phosphorus compounds obtained by the novel process can serve as pesticides, especially insecticides, or as intermediates in the manufacture of same, e.g.

$CH_3PSCl_2$ a product of the process of the invention can be reacted first with an equimolar amount of ethyl alcohol in the presence of an HCl acceptor such as an amine or sodium carbonate to form $CH_3PSCl(OC_2H_5)$, then with an equimolar amount of $HOCH_2CH_2CN$ in the presence of an HCl acceptor to give $CH_3PS(OC_2H_5)(OC_2H_4CN)$, an insecticidal compound.

Example 7

A mixture of 100 g. of $PSCl_3$ (0.59 mole) and 37 g. of $Pb(C_2H_5)_4$ (0.115 mole) is refluxed with stirring for 10 hours. Then, the precipitated $PbCl_2$ is filtered off, washed with carbon tetrachloride (23 g. $PbCl_2$) and the filtrate is fractionally distilled.

Yield.—41 g. $C_2H_5PSCl_2$ (=87.8%); B.P. 177–181° C./740 mm. 5.7 g. $(C_2H_5)_2PSCl$ (=12.2%); B.P. 195–200° C./740 mm.

The chemical shift is in accordance with that obtained with authentic samples: $C_2H_5PSCl_2$ −94 p.p.m. (literature −94.3 p.p.m.); $(C_2H_5)_2PSCl$ −108.3 p.p.m. (literature −108.3 p.p.m.). Additional 10 g. of $PbCl_2$ remain as a residue after the distillation. Thus, the theoretic amount of $PbCl_2$ is yielded.

94% of the theoretically available ethyl groups of the tetraethyllead are isolated in the form of ethylthiophosphonyl and ethylthiophosphinyl chloride.

Example 8

A mixture of 32 g. of $PSCl_3$ (0.189 mole) and 22 g. of $Pb(C_6H_5)_4$ (0.042 mole) is heated in a sealed Pyrex tube or in an autoclave under nitrogen at 180° C. for 160 hours. Then, the precipitated $PbCl_2$ is filtered off, washed with carbon tetrachloride and the filtrate is fractionally distilled.

Yield.—5.6 g. $C_6H_5PSCl_2$ (=34%); B.P. 100° C./1 mm.; chemical shift −74.4 p.p.m. 10.5 g.

$(C_6H_5)_2PSCl$ (=66%); B.P. 160–163° C./0.5 mm.; chemical shift −79.6 p.p.m.

82% of the theoretically available phenyl groups of the tetraphenyllead are isolated in form of phenylthiophosphonyl and phenylthiophosphinyl chloride.

Example 9

56.5 g. (0.3 mole) of $(C_2H_5O)_2PSCl$ and 32.3 g. (0.1 mole) of $Pb(C_2H_5)_4$ are brought together and refluxed with stirring for 16 hours. The precipitated $PbCl_2$ is filtered off, washed with ether and the filtrate is fractionated.

Yield.—49.3 g. (=90%) $(C_2H_5O)_2P(S)C_2H_5$; B.P. 86–87° C./12 mm.; $n_D^{20}$ 1.4617

Example 10

56.0 g. (0.3 mole) of $[(CH_3)_2N]_2P(S)Cl$ and 26.7 g. (0.1 mole) of $Pb(CH_3)_4$ are brought together and refluxed with stirring for 12 hours. The precipitated $PbCl_2$ is filtered off, washed with ether and the filtrate is fractionated.

Yield.—45.3 g. (=91%) $[(CH_3)_2N]_2P(S)CH_3$; B.P. 245° C.

The examples which are compiled in the following tables have been carried out in the same manner.

TABLE 1.—ALKYLATION OF PHOSPHORUS COMPOUNDS WITH $Pb(CH_3)_4$, DISSOLVED IN TOLUENE
[85% solution]

| P-Compound | Ratio P-Comp.:$Pb(C_2H_5)_4$ | Heating Time at 125° C. in hours | Products | Yield, Percent |
| --- | --- | --- | --- | --- |
| $C_6H_5PSCl_2$ | 2.3:1 | 120 | $C_6H_5(CH_3)PSCl$ | 90 |
| $CH_3PSCl_2$ | 2.5:1 | 200 | $(CH_3)_2PSCl$ | 81 |
| $C_6H_5POCl_2$ | 2.3:1 | 200 | $C_6H_5(CH_3)POCl$ | 19 |
| $(CH_3)_2PSCl$ | 2.5:1 | 200 | $(CH_3)_3PS$ | 12 |

TABLE 2.—ALKYLATION OF PHOSPHORUS COMPOUNDS WITH $Pb(C_2H_5)_4$

| P-Compound | Ratio P-Comp.:$Pb(C_2H_5)_4$ | Heating Time at 125° C. in hours | Products | Yield, Percent |
|---|---|---|---|---|
| $PSCl_3$ | 2.73:1 | 39 | $C_2H_5PSCl_2$ | 92 |
| | | | $(C_2H_5)_2PSCl$ | 8 |
| $CH_3PSCl_2$ | 1.94:1 | *66 | $CH_3C_2H_5PSCl$ | 77 |
| $CH_3PSCl_2$ | 1.94:1 | 136 | $CH_3(C_2H_5)PSCl$ | 58 |
| | | | $CH_3(C_2H_5)_2PS$ | 35 |
| $C_6H_5PSCl_2$ | 1.92:1 | *66 | $C_2H_5(C_6H_5)PSCl$ | 70 |
| | | | $(C_2H_5)_2(C_6H_5)PS$ | 20 |
| $C_6H_5PSCl_2$ | 1.92:1 | 136 | $C_2H_5(C_6H_5)PSCl$ | 47 |
| | | | $(C_2H_5)_2(C_6H_5)PS$ | 44 |
| $(CH_3)_2PSCl$ | 1.89:1 | 130 | $(CH_3)_2C_2H_5PS$ | 84 |
| $POCl_3$ | 2.64:1 | 90 | $C_2H_5POCl_2$ | 40 |
| | | | $(C_2H_5)_2POCl$ | 20 |
| $ClCH_2POCl_2$ | 1.87:1 | 160 | $C_2H_5(ClCH_2)POCl$ | 42 |
| $C_6H_5POCl_2$ | 1.77:1 | 120 | $C_2H_5(C_6H_5)POCl$ | 50 |

*115° C.

TABLE 3.—ARYLATION OF PHOSPHORUS COMPOUNDS WITH $Pb(C_6H_5)_4$

| P-Compound | Ratio P-Comp.:$Pb(C_6H_5)_4$ | Heating Time at 180° C. in hours | Products | Yield, Percent |
|---|---|---|---|---|
| $PSCl_3$ | 3.0:1 | 180 | $C_6H_5PSCl_2$ | 35 |
| | | | $(C_6H_5)_2PSCl$ | 32 |
| $CH_3PSCl_2$ | 1.0:1 | 66 | $CH_3(C_6H_5)PSCl$ | 100 |
| $C_6H_5PSCl_2$ | 2.1:1 | 136 | $(C_6H_5)_2PSCl$ | 94 |
| | | | $(C_6H_5)_3PS$ | 6 |
| $ClCH_2PSCl_2$ | 1.9:1 | 180 | $ClCH_2(C_6H_5)PSCl$ | 46 |
| $POCl_3$ | 3.01:1 | 180 | $C_6H_5POCl_2$ | 29 |
| | | | $(C_6H_5)_2POCl$ | 15.5 |
| $C_6H_5POCl_2$ | 1.93:1 | 66 | $(C_6H_5)_2POCl$ | 68 |
| $ClCH_2POCl_2$ | 2.0:1 | 180 | $ClCH_2(C_6H_5)POCl$ | 11 |

TABLE 4.—ARYLATION OF $PCl_3$ AND $PSCl_3$ WITH TETRAPHENYLTIN

| P-Compound | Ratio P-Comp.:$Sn(C_6H_5)_4$ | Heating Time at 180° C. in hours | Products | Yield, Percent |
|---|---|---|---|---|
| $PCl_3$ | 3.1:1 | 350 | $(C_6H_5)PCl_2$ | 65 |
| $PSCl_3$ | 3.09:1 | 130 | $C_6H_5PSCl_2$ | 58 |
| | | | $(C_6H_5)_2PSCl$ | 36 |

*Example 11*

In a two-necked flask provided with a reflux condenser and a stirrer are given 50.8 g. (0.3 mole) of $PSCl_3$ and 26.7 g. (0.1 mole) of $Pb(CH_3)_4$. Then, 2.6 g. (0.02 mole) $AlCl_3$ (technical grade) are added, thereby a slight exothermic reaction can be observed. The reaction mixture is refluxed for 14 hours. The temperature of the content of the flask is at the beginning 117° C. and then rises at first slowly, later faster, gradually to 135° C. Now, the content of the flask is a rather bulky paste. After cooling to room temperature, the precipitated $PbCl_2$ is filtered off and washed several times with $CCl_4$. The filtrate is fractionated through a spinning band column. The following fractions are collected:

(1) $CCl_4$
(2) 120–130° C./725 mm. 3 g. $n_D^{20}$ 1.5431 mainly $PSCl_3$
(3) 130–140° C./725 mm. 9 g. $n_D^{20}$ 1.5530 mixture 1:1 of $PSCl_3$ and $CH_3PSCl_2$
(4) 145–153° C./725 mm. 17.5 g. $n_D^{20}$ 1.5509 $CH_3PSCl_2$
(5) 160–176° C./725 mm. 6.0 g. $n_D^{20}$ 1.5501 $(CH_3)_2PSCl$ The yields of alkylated phosphorus compounds are as follows:

G.
$CH_3PSCl_2$ (78.8%) ---------------------------- 22
$(CH_3)_2PSCl$ (21.4%) ---------------------------- 6

On this basis, 80% of the available methyl groups of the tetramethyl lead are obtained as methylated phosphorus compounds. Without using a catalyst there are obtained about the same yields upon heating for 30–40 hours.

*Example 12*

In a two-necked flask provided with a reflux condenser and a stirrer 100 g. (0.59 mole) of $PSCl_3$, 37 g. (0.115 mole) of $Pb(C_2H_5)_4$ and 1.3 g. (0.01 mole) of $AlCl_3$ are refluxed for 3 hours. The precipitated $PbCl_2$ is filtered off and washed with carbon tetrachloride. On fractional distillation of the filtrate are obtained 39 g. (83.4%) of $C_2H_5PSCl_2$; B.P. 177–181° C./740 mm., and 5.1 g. (11.0%) of $(C_2H_5)_2PSCl$; B.P. 225–227° C./740 mm. There are obtained 85% of the available ethyl groups of the tetraethyl lead in form of phosphorus compounds. Without using a catalyst, under the same conditions are obtained identical yields after about 10 hours heating.

*Example 13*

In a two-necked flask provided with a reflux condenser and a stirrer 56.0 g. (0.3 mole) of $[(CH_3)_2N]_2P(S)Cl$, 26.7 g. (0.1 mole) of $Pb(CH_3)_4$ and 1.3 g. (0.01 mole) of $AlCl_3$ are refluxed for 2 hours. The precipitated $PbCl_2$ is filtered off and washed with ether. On fractional distillation of the filtrate are obtained 43.5 g. (87%) of $[(CH_3)_2N]_2P(S)CH_3$; B.P. 245° C. Without using a catalyst, under the same conditions are obtained identical yields after about 12 hours heating.

*Example 14*

In a two-necked flask provided with a reflux condenser and a stirrer 56.5 g. (0.3 mole) of $(C_2H_5O)_2P(S)Cl$, 32 g. (0.1 mole) of $Pb(C_2H_5)_4$ and 1.3 g. (0.01 mole) of $AlCl_3$ are refluxed for 3 hours. The precipitated $PbCl_2$ is filtered off and washed with ether. On fractional distillation of the filtrate are obtained 50.8 g. (94%) of $(C_2H_5O)_2P(S)C_2H_5$; B.P. 86–87° C./12 mm.; $n_D^{20}$ 1.4617. Without using a catalyst, under the same conditions are obtained identical yields after about 16 hours heating.

Example 15

A mixture of 23.4 g. (0.15 mole) of $(C_2H_5)_2PSCl$, 44.2 g. (0.05 mole) of $Pb(C_{12}H_{25})_4$, 0.7 (0.005 mole) of $AlCl_3$ and 200 ml. of n-octane is refluxed for 4 hours. The precipitated $PbCl_2$ is filtered off. On fractional distillation there are obtained 31.5 g. (72%) of diethyldodecylphosphine sulfide; B.P. 155–165°/0.2 mm., $n_D^{20}$ 1.4971.

Example 16

A mixture of 19.2 g. (0.15 mole) of $(CH_3)_2PSCl$, 49.8 g. (0.05 mole) of $Pb(C_{14}H_{29})_4$, 1.4 g. (0.01 mole) of $AlCl_3$ and 200 ml. of n-octane is refluxed for 4 hours. The precipitated $PbCl_2$ is filtered off. On fractional distillation there are obtained 31.5 g. (68.8%) of dimethyltetradecylphosphine sulfide; B.P. 186–190° C./0.2 mm., M.P. 55–56° C.

About the same yields are obtained when the mixture is distilled without removing the lead dichloride.

Example 17

A mixture of 32 g. (0.189 mole) of $PSCl_3$, 22 g. (0.042 mole) of $Pb(C_6H_5)_4$ and 2.6 g. (0.02 mole) of $AlCl_3$ is heated at 180° C. for 12 hours in a closed vessel. The precipitated $PbCl_2$ is filtered off, washed with carbon tetrachloride and the filtrate is fractionally distilled. The yields of phenylated phosphorus compounds are as follows:

5.6 g. (34%) of $C_6H_5PSCl_2$; B.P. 100° C./1 mm.; chemical shift −74.4 p.p.m.

10.5 g. (66%) of $(C_6H_5)_2PSCl$; B.P. 160–163° C./0.5 mm.; chemical shift −79.6 p.p.m.

82% of the theoretically available phenyl groups of the tetraphenyllead are isolated in form of phenylthiophosphonyl chloride and phenylthiophosphinyl dichloride.

Example 18

A mixture of 100 g. (0.59 mole) of $PSCl_3$, 36.1 g. (0.115 mole) of $Pb(CH=CH_2)_4$ and 1.3 g. (0.01 mole) of $AlCl_3$ is refluxed for 10 hours with stirring. Then, the precipitated $PbCl_2$ is filtered off and washed with $CCl_4$. On fractional distillation of the filtrate one obtains 50 g. (84%) of $CH_2=CHPSCl_2$; B.P. 54–55° C., $n_D^{20}$ 1.5623, and 3.3 g. (11%) of $(CH_2=CH)_2PSCl$; B.P. 220–221° C./740 mm.

Thus, 95% of the vinyl groups put in the reaction in the form of lead compound are isolated as vinylphosphorus compounds.

What is claimed is:

1. A process for exchanging halogens for hydrocarbon radicals in phosphorus halide compounds comprising reacting a phosphorus halide compound of the formula $R_nP(A)_mX_{3-n}$ wherein R is selected from the class consisting of hydrocarbyl, halohydrocarbyl, hydrocarbonoxy and dialkylamino having not more than 18 carbon atoms in each hydrocarbon group, n is an integer from 0 to 2, A is selected from the class consisting of sulfur and oxygen, m is an integer from 0 to 1, and X is selected from the class consisting of chlorine and bromine, with an organo lead compound of the formula $R'_aPbX'_{4-a}$ wherein R' is hydrocarbyl having not more than 18 carbon atoms, a is an integer from 2 to 4, X' is a halogen atom, in the presence of a strong Lewis acid.

2. A process of claim 1 wherein said strong Lewis acid is aluminum chloride.

3. A process of claim 2 wherein R is aryl hydrocarbon, n is at least 1, m is 0, X is chlorine, R' is alkyl, and a is 4.

4. A process of claim 2 wherein one R is aryl hydrocarbon, one R is alkyl, n is 2, m is 0, X is chlorine, R' is alkyl, and a is 4.

5. A process of claim 2 wherein R is dialkylamino, n is at least 1, m is 0, X is chlorine, R' is alkyl, and a is 4.

6. A process of claim 2 wherein n is 0, A is sulfur, m is 1, X is chlorine, R' is alkyl, and a is 4.

7. A process of claim 2 wherein R is dialkylamino, n is at least 1, A is sulfur, m is 1, X is chlorine, R' is alkyl, and a is 4.

8. A process of claim 2 wherein R is alkoxy, n is at least 1, A is sulfur, m is 1, X is chlorine, R' is alkyl, and a is 4.

9. A process of claim 2 wherein R is alkyl, n is 2, A is sulfur, m is 1, X is chlorine, R' is alkyl, and a is 4.

10. A process of claim 2 wherein n is 0, A is sulfur, m is 1, X is chlorine, R' is aliphatic having olefinic unsaturation, and a is 4.

11. A process of claim 2 wherein n is 0, A is sulfur, m is 1, X is chlorine, R' is aryl hydrocarbon, and a is 4.

No references cited.

CHARLES B. PARKER, *Primary Examiner.*

RICHARD L. RAYMOND, *Assistant Examiner.*